(12) United States Patent
Watts

(10) Patent No.: US 7,319,959 B1
(45) Date of Patent: Jan. 15, 2008

(54) MULTI-SOURCE PHONEME CLASSIFICATION FOR NOISE-ROBUST AUTOMATIC SPEECH RECOGNITION

(75) Inventor: Lloyd Watts, Palo Alto, CA (US)

(73) Assignee: Audience, Inc., Mountain View, CA (US)

( * ) Notice: Subject to any disclaimer, the term of this patent is extended or adjusted under 35 U.S.C. 154(b) by 905 days.

(21) Appl. No.: 10/439,284

(22) Filed: May 14, 2003

Related U.S. Application Data

(60) Provisional application No. 60/380,614, filed on May 14, 2002.

(51) Int. Cl.
G10L 15/02 (2006.01)

(52) U.S. Cl. .................. 704/254; 704/205; 704/243; 704/255

(58) Field of Classification Search .............. None
See application file for complete search history.

(56) References Cited

U.S. PATENT DOCUMENTS

| | | | | | |
|---|---|---|---|---|---|
| 3,946,157 | A | * | 3/1976 | Dreyfus | 704/254 |
| 4,813,076 | A | * | 3/1989 | Miller | 704/254 |
| 5,054,085 | A | * | 10/1991 | Meisel et al. | 704/207 |
| 5,640,490 | A | * | 6/1997 | Hansen et al. | 704/254 |
| 5,787,414 | A | * | 7/1998 | Miike et al. | 707/2 |
| 6,018,708 | A | * | 1/2000 | Dahan et al. | 704/244 |
| 6,067,517 | A | * | 5/2000 | Bahl et al. | 704/256.4 |
| 6,757,652 | B1 | * | 6/2004 | Lund et al. | 704/254 |
| 6,954,745 | B2 | * | 10/2005 | Rajan | 706/22 |

* cited by examiner

*Primary Examiner*—Donald L. Storm
(74) *Attorney, Agent, or Firm*—Carr & Ferrell LLP

(57) ABSTRACT

A system and method are disclosed for processing an audio signal including separating the audio signal into a plurality of streams which group sounds from a same source prior to classification and analyzing each separate stream to determine phoneme-level classification. One or more words of the audio signal may then be outputted.

15 Claims, 9 Drawing Sheets

(a) Human Auditory Pathway  (b) Applied Neurosystems' noise-robust speech recognizer.  (c) Conventional speech recognizer.

(a) Human Auditory Pathway  (b) Applied Neurosystems' noise-robust speech recognizer.  (c) Conventional speech recognizer.

Figure 8

MULTI-SOURCE PHONEME CLASSIFICATION FOR NOISE-ROBUST AUTOMATIC SPEECH RECOGNITION

CROSS-REFERENCE TO RELATED APPLICATIONS

This application claims priority to U.S. Provisional Patent Application No. 60/380,614 entitled "Noise-Robust Methods for High-Performance Automatic Speech Recognition" filed May 14, 2002, which is incorporated herein by reference for all purposes.

FIELD OF THE INVENTION

The present invention relates generally to signal processing, and more specifically, to a speech recognition system.

BACKGROUND OF THE INVENTION

Current automatic speech recognition systems continued to show-difficulty in processing speech in multi-speaker and high noise environments despite the availability of substantially increased processing power. To achieve high-performance speech recognition in multi-speaker and high noise environments, a speech recognition system that uses the same cues for recognition and noise robustness that human beings do is needed. Such a system should be based on detailed neurobiological and psychoacoustic knowledge of human auditory function, accomplishing noise robustness via auditory stream separation and by using noise-robust phonetic cues.

The human approach to noise robustness is based on a high-resolution spectral analysis, followed by intelligent groupings of fine-grained sound features that can be ascribed to a common source. By contrast, conventional speech recognition systems achieve the groupings of fine-grained sound features by indiscriminately blurring them together in a 22-point mel-scale filterbank and a 10-20 millisecond frame. This approach works passably in quiet environments, but is the major limiting factor preventing conventional recognizers from achieving noise robustness—once the signal features have been blurred in with the other sounds, they can never be recovered.

SUMMARY OF THE INVENTION

A system and method are disclosed for processing an audio signal including separating the audio signal into a plurality of streams which group sounds from a same source prior to classification and analyzing each separate stream to determine phoneme-level classification. One or more words of the audio signal may then be outputted which may be utilized for further processing.

According to exemplary embodiments, a high-performance, noise-robust real-time speech recognition system based on biologically verifiable models of the human auditory pathway is provided. The noise-robust speech recognition system may comprise a performance target of 99.5% word accuracy in quiet conditions and robust performance (e.g., accuracy degradation of less than 1%) at a speech-to-noise ratio of 10 dB.

The high spectro-temporal resolution of the cochlea allows local regions of high signal-to-noise ratio to be isolated from the other sounds and to be intelligently combined for optimal overall performance. The cochlear resolution is fine enough to resolve individual harmonic components and glottal pulses, to track fast formant transitions during plosive bursts, and to detach timing differences on the order of a few microseconds for fine positioning of sound sources.

BRIEF DESCRIPTION OF THE DRAWINGS

FIG. 8 is a confusion matrix illustrating an analysis of errors made by the OGI/CSLU system on TIMIT phoneme recognition.

DETAILED DESCRIPTION OF EXEMPLARY EMBODIMENTS

Figure 1:
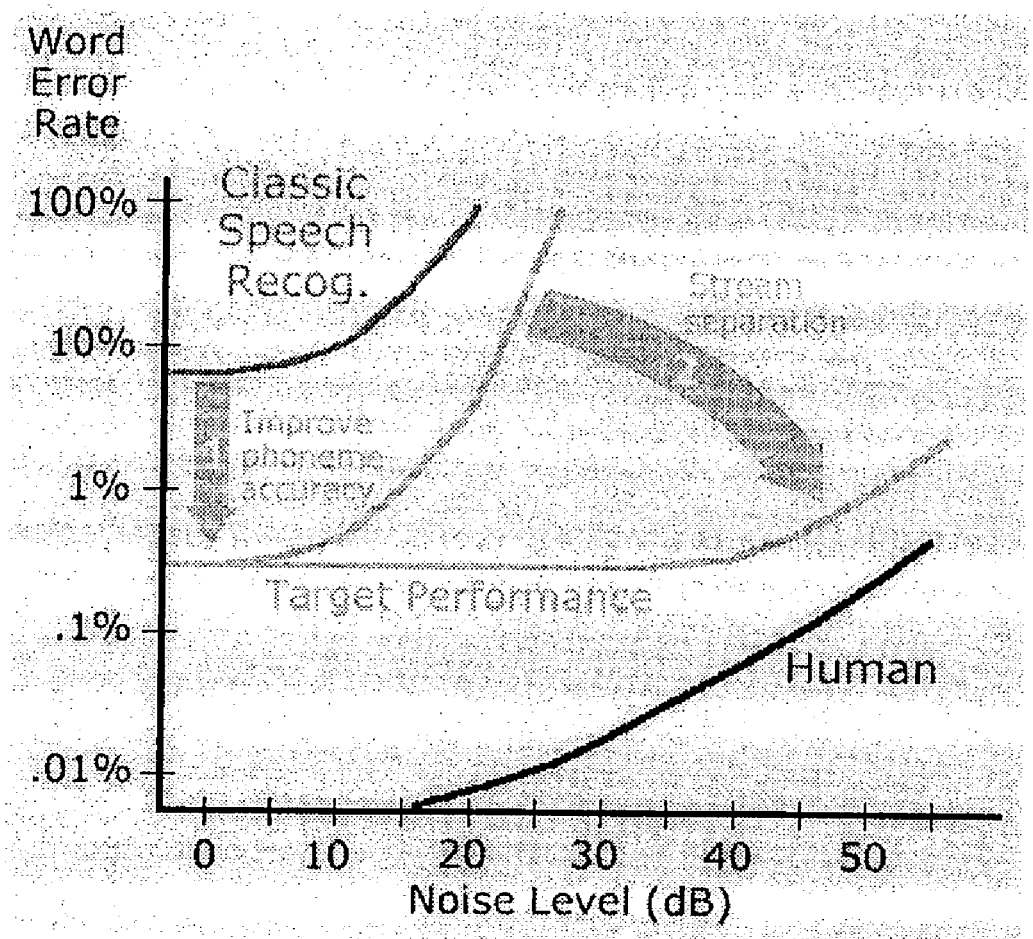
FIG. 1 illustrates performance changes from a conventional speech recognizer versus noise level according to exemplary embodiments of the present invention.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more exemplary embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims, and the invention encompasses numerous alternatives, modifications, and equivalents. For the purpose of example, numerous specific details are set forth in the following description in order to provide a through understanding of the present invention. The present invention may be practiced according to the claims without some of all of these specific details. For the purpose of clarity, technical material that is known in the technical fields related to the invention is not described in detail so that the present invention is not unnecessarily obscured.

According to exemplary embodiments, a high-performance, noise-robust real-time speech recognition system based on biologically verifiable models of the human auditory pathway is provided. The noise-robust speech recognition system may provides a performance target of 99.5% word accuracy in quiet conditions and robust performance (e.g., accuracy degradation of less than 1%) at a speech-to-noise ratio of 10 dB. A technical approach to the exemplary noise-robust speech recognition system may begin with a working speech recognition system based on established technology, and then carefully replacing and/or augmenting the exemplary noise-robust speech recognition system as needed to improve performance to the target levels, using detailed knowledge of neurobiology and psychoacoustics as a guide.

The exemplary noise-robust speech recognition system comprises key innovations in the technical approach, as compared to the standard approach, including: replacing a low-resolution Fast Fourier Transform with a high-resolution cochlear model, as necessary to support subsequent stream separation and phoneme identification steps; achieving noise robustness via high-resolution noise-threshold tracking; achieving noise robustness via auditory stream separation prior to speech-specific processing; achieving higher phoneme-level classification accuracy by providing higher-salience inputs to the classifier, including spectral envelope, transient detection, and pitch/voicing; achieving higher phoneme-level classification accuracy by normalizing for speaker characteristics prior to classification; achieving higher phoneme-level classification accuracy by training with a full (not reduced) phoneme target set; and achieving higher word-level accuracy by incorporating a model of syllabic stress.

Figure 2:
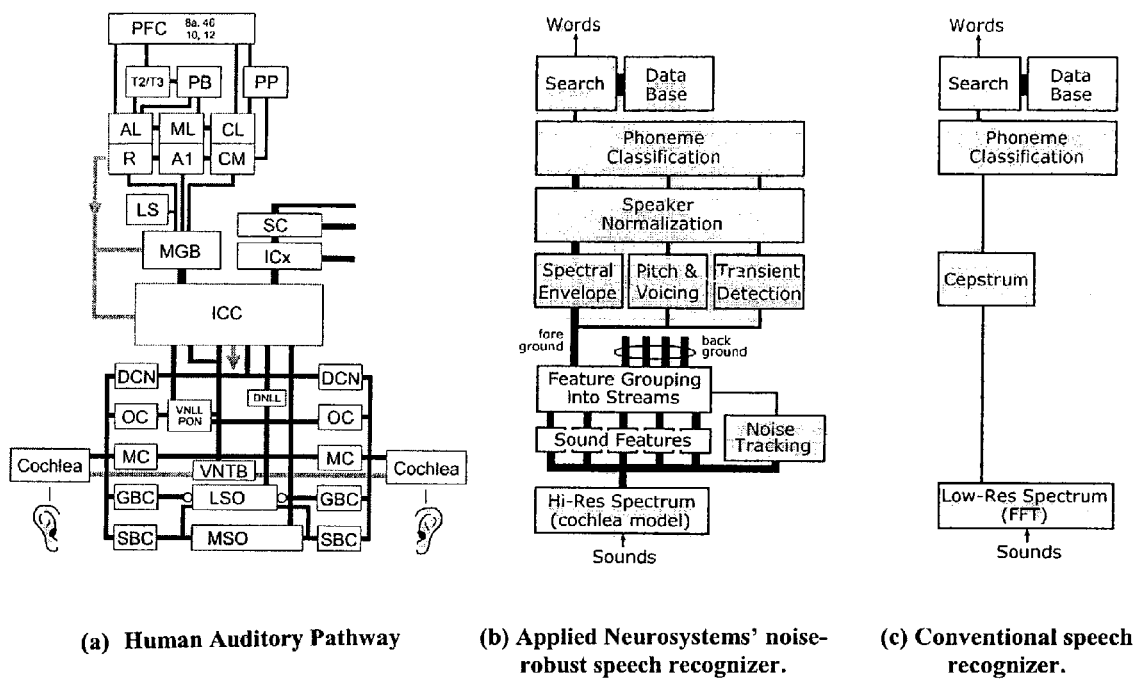
FIG. 2a is a diagram of a human auditory pathway.
FIG. 2b is a block diagram of an exemplary noise-robust speech recognizer, according to one embodiment of the present invention.
FIG. 2c is a diagram of a conventional speech recognizer.
Figure 3:
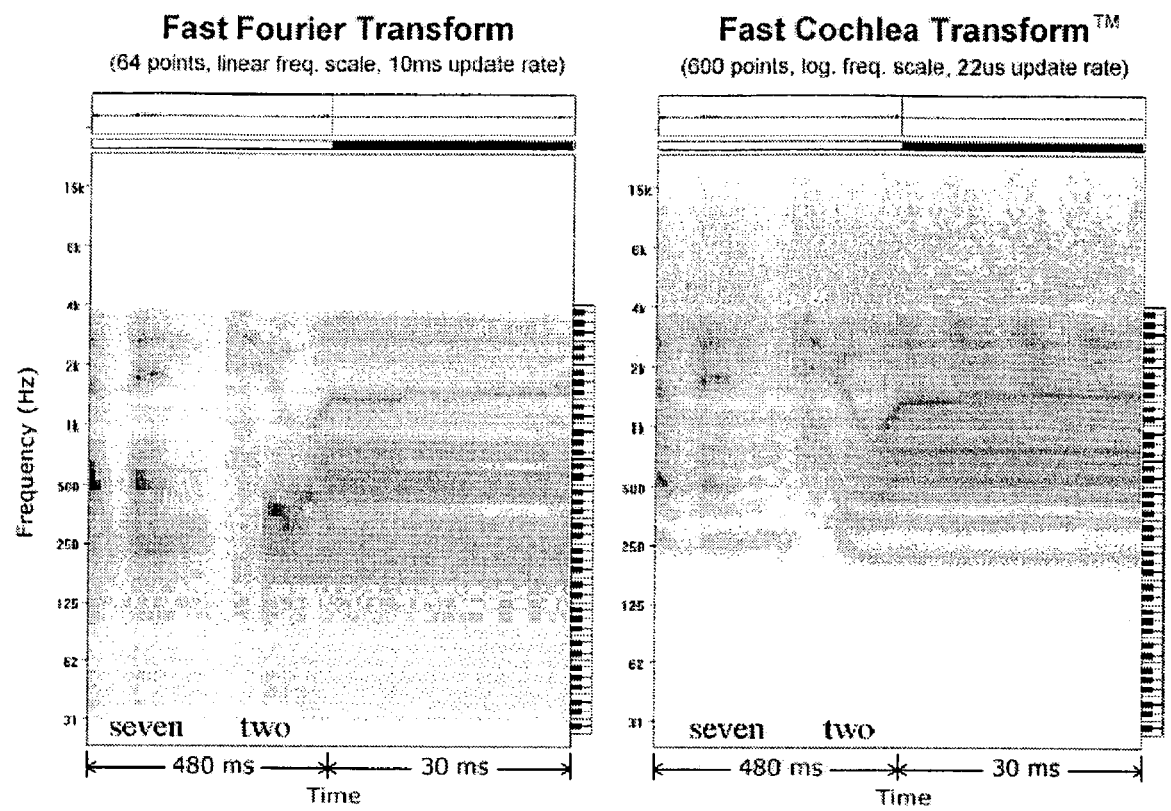
FIG. 3 illustrates a comparison of a Fast Fourier Transform embodiment versus a fast cochlea transform according to one embodiment of the present invention.

A block diagram of an exemplary noise-robust speech recognizer is shown in FIG. 2(b), alongside block diagrams of the human auditory pathway (FIG. 2 (a)) and a conventional speech recognizer (FIG. 2 (c)) for reference. The exemplary noise-robust speech recognizer is designed to efficiently model known properties of the human auditory pathway, while building on and extending successful components of conventional recognizers.

In exemplary embodiments, the low-resolution Fast Fourier Transform is replaced with a high-resolution cochlear model, as necessary to support subsequent processing steps. Conventional recognizers typically compute a low-resolution spectrum (e.g., 64 spectral values, updated once every 10 milliseconds) based on the Fast Fourier Transform (FFT). By comparison, the human cochlea computes 3000 spectral values with 6 microsecond resolution. The noise-robust speech recognizer computes 600 spectral values, on a logarithmic frequency scale, with 6 microsecond resolution post-interpolation. The noise-robust speech recognizer is, in exemplary embodiments, designed to obey critical bandwidth curves, Fletcher-Munson loudness/compression curves, and matches latencies found in biological cochleas. In some embodiments, a minimum spectral resolution of 60 taps/octave (5 taps per musical semitone) is necessary to separate multiple speakers based on spectral pitch cues. Fine temporal resolution is necessary both for binaural inter-aural timing difference cues (e.g., separating sound sources based on position), for detecting glottal pulses as a temporal-pitch grouping cue in voiced sounds such as vowels, and for analyzing transients for higher phoneme classification performance on plosives.

In exemplary embodiments, noise robustness is achieved via high-resolution noise-threshold tracking. Conventional recognizers use bandpass filtering of cepstral coefficients (RASTA) or cepstral means subtraction to accomplish rudimentary noise robustness. By contrast, the human auditory system uses fine tracking of recent noise floor and adjustment of gain, in a feedback loop from the cochlea through the multipolar cells (MC), to the ventral nucleus of the trapezoid body (VNTB), and back to the outer hair cells of the cochlea through the olivocochlear bundle. In exemplary embodiments, the noise-robust speech recognizer uses noise-threshold tracking to adjust gain and set noise floor reference levels, so that the distributed but locally-concentrated energy in the speech signal can be detected in its regions of greatest signal-to-noise ratio.

Noise robustness may be achieved via auditory stream separation prior to speech-specific processing. Conventional recognizers completely fail when other nonstationary sounds are present in the environment. For example, other people talking in a background, impulsive noises such as explosions, and moving FM sounds such as sirens, are simply blurred into the low-resolution filterbank/cepstrum, thus corrupting the speech signal. The human auditory pathway computes many fine-grained sound features in the auditory brainstem, for feature grouping and separation into streams in a cortex. The noise-robust speech recognizer computes the same features (e.g., spectral energy, fine timing of spectral peaks, transient detection, spectral edges, binaural cues such as inter-aural time and level differences, etc.) and uses principles of auditory scene analysis (e.g., common onset, common FM, common AM, etc.) to group sounds that come from the same source. This allows sounds from multiple simultaneous sources to be separated from each other prior to recognition. This grouping process, operating on fine-grained, separable features, followed by spectral envelope detection within a grouped stream, replaces an "ignorance model" afforded by the mel-scale filterbank.

In exemplary embodiments, higher phoneme-level classification accuracy may be achieved by providing higher-salience inputs to the classifer, including spectral envelope, transient detection, and pitch/voicing. Existing recognizers use a cepstrum and its temporal derivatives, updated once every 10-20 ms, as a sole input to phoneme classification. This approach has led to some success because it provides a rudimentary invariance to pitch/voicing by throwing away pitch information, and extracting an estimate of spectral envelope. In contrast, the human auditory pathway uses multiple parallel pathways to extract spectral envelope, after stream separation.

The exemplary noise-robust speech recognizer extracts an accurate estimate of spectral envelope based on pitch/voicing cues, and on a much finer time-scale (e.g., 1 ms) so as to be able to track fast formant changes associated with consonant closures. These fact formant changes have been recently found to be vital cues for accurate detection of consonants in noise. Similarly, accurate determination of pitch/voicing is necessary for detecting voice-onset-time (e.g., a cue for distinguishing voice/unvoiced plosives such as P/B), for prosody and syllabic stress in English, and for word identification in languages such as Mandarin. Accurate spectral and temporal characterization of transients is necessary for identifying and distinguishing plosives. Taken together, these cues provide sufficient information to allow a phoneme classifier, according to one embodiment, to make the acoustic-phonetic distinctions necessary for high-performance recognition.

Higher phoneme-level classification accuracy may be achieved by normalizing for speaker characteristics prior to classification. Formant frequencies are dependent on vocal track dimensions, which are highly speaker-dependent. For example, men have lower formant frequencies, while women have intermediate formant frequencies, and children have the highest formant frequencies. Existing recognizers ignore this fact and attempt to create a single set of classification regions, with the result that existing recognizers are not robust to speaker variation. The exemplary noise-robust speech recognizer uses psychophysically-justified cues to build an adaptive expectation of speaker formant ranges, and normalizes prior to classification, to provide greater robustness to speaker variation.

Higher phoneme-level classification accuracy may be achieved by training with a full (not reduced) phoneme target set. In the late 1980's, when computing power was more limited, it was found that a performance improvement could be achieved by reducing a target phoneme set in a training phrase. For example, a stop closures (pcl, tcl, kcl, dcl, gcl) could be mapped to silence <.pau>, with no apparent degradation in performance but a reduction in training time. In another example, non-speech sounds such as inhalations and sniffs are often mapped to h#, (a symbol for pre-speech silence), when in fact these sounds are detectable audio events that humans clearly identify and then disregard. Part of the poor performance of existing recognizers can be ascribed to training with insufficient specificity in the target phoneme set. By using every available phoneme in the training set, the exemplary phoneme classifier may be configured to determine the right distinctions.

Higher word-level accuracy may be achieved by incorporating a model of syllabic stress. Current recognizers are based entirely on phoneme strings, with only a nod to syllabic stress (e.g., existence of stress-reduced phonemes such as axr for the unstressed "er" sound in "butter", as compared to er for the stressed "er" sound in "bird"—where these classes are often folded together in a reduced phoneme set. The exemplary noise-robust speech recognizer is trained on data with syllabic stress identification, and is designed to use syllabic stress as an additional cue in a Viterbi search.

Exemplary embodiments of the present invention optimize initially for highest possible recognition performance and defer cost optimization until the performance targets have been met. The conceptual framework for existing recognizer architecture was formulated in the 1970's and 1980's, when computing power was extremely limited. At that time, there was not sufficient computing power to make progress with the high-resolution techniques utilized by exemplary embodiments of the present invention. However, many researchers saw the progress that was made by early bandwidth reduction in the computational pipeline, and concluded that throwing away information was a necessary step for recognition.

The exemplary noise-robust speech recognizer is configured to preserve and extract as much information as possible, to achieve the targets of high recognition performance and noise robustness. These computations are necessarily more expensive than the conventional approach. Premature optimization for cost has been a contributor to current performance limits in speech recognition. As a result, the exemplary noise-robust speech recognizer uses efficient algorithms and methods to achieve optimal performance, and exploits the existence of modern high-performance DSP technology and the power of Moore's Law to justify optimizing first for accuracy and noise robustness, then later optimizing for cost and computational complexity.

Exemplary methods based on exemplary embodiments of the present invention are provided below.

High Resolution Cochlear Model.

A first stage of processing comprises having adequate resolution to support stream separation and feature extraction for high-accuracy phoneme recognition. According to exemplary embodiments, individual harmonics and glottal pulses, as necessary, for stream separation, pitch detection, etc. are resolved.

Bi-aural Processing of Inter-Aural Time and Level Differences.

Figure 4:
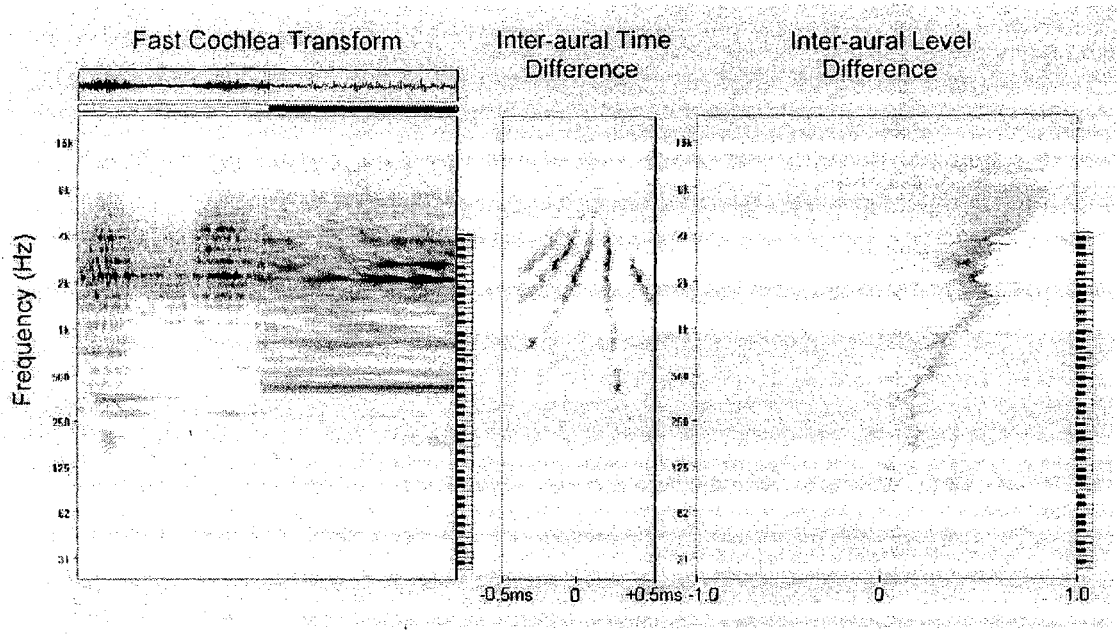
FIG. 4 illustrates a response of a binaural representations to a sound source positioned to a right of a stereo microphone pair.

These representations are valuable for stream separation and sound source location, when, for example, stereo microphones are available. Stereo cochlear and ITD and ILD algorithms already exist for real-time desktop PC operation. FIG. 4 shows a response of binaural representations to a sound source positioned to a right of the stereo microphone pair.

Tone Tracking and Preliminary Stream Separation.

Figure 5:
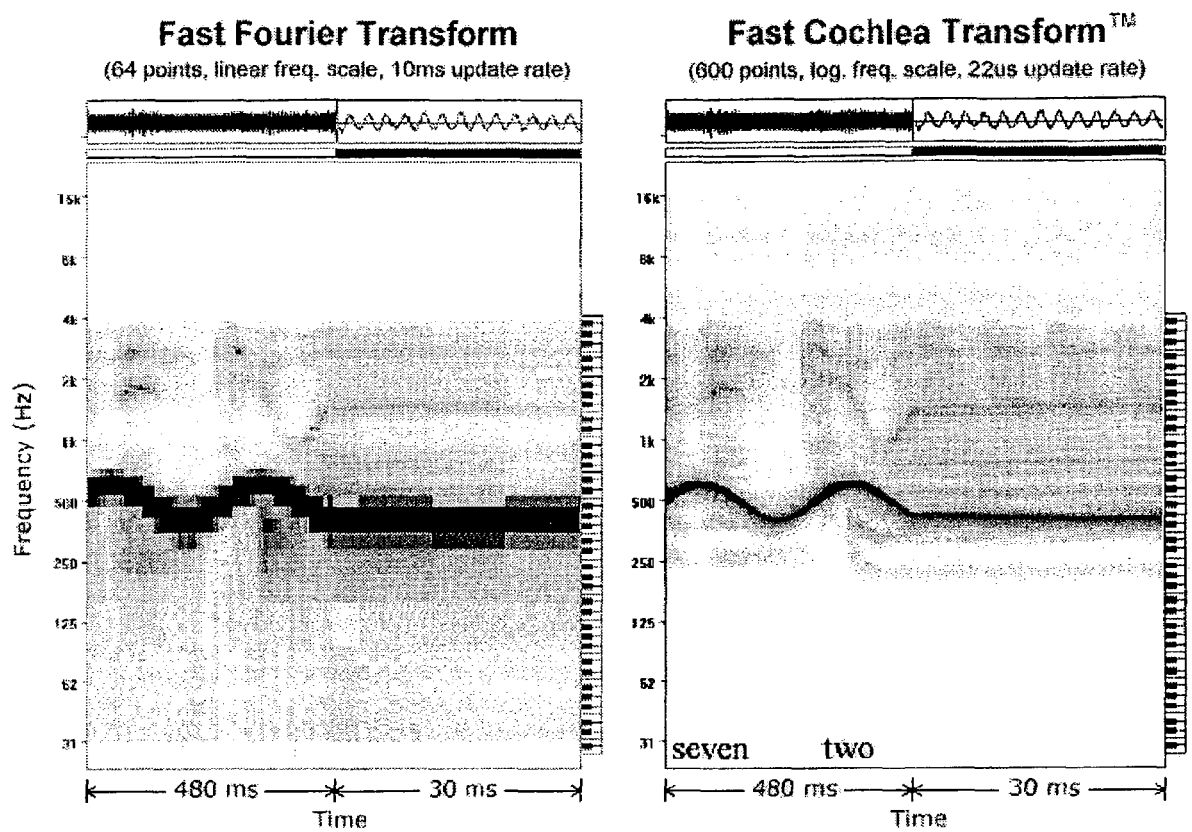
FIG. 5 illustrates a use of a high resolution cochlea model for stream separation.
Figure 6:
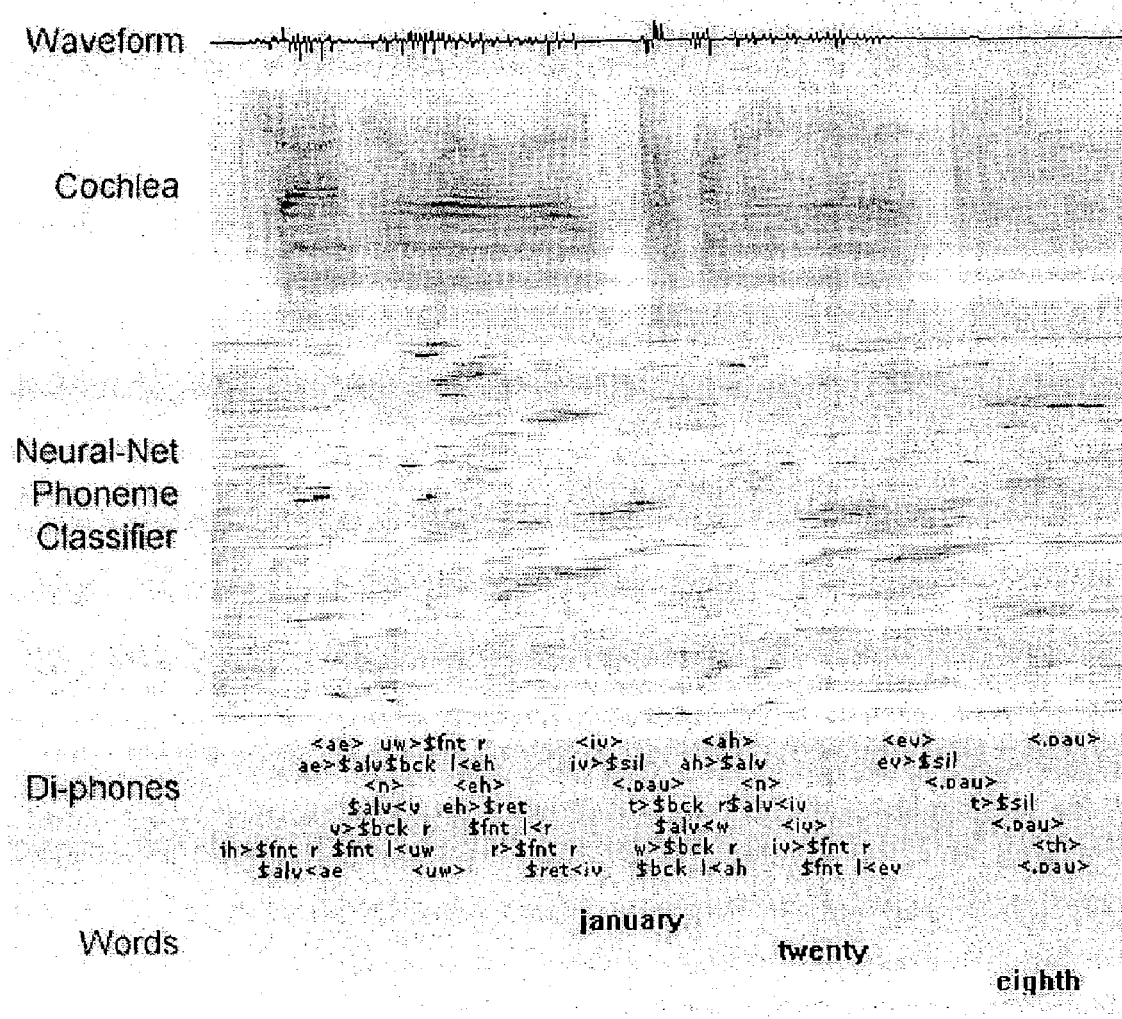
FIG. 6 illustrates a transformation from a waveform of an audio signal into words according to one embodiment of the present invention.

FIG. 5 illustrates the use of the high resolution cochlea model in a rudimentary proof of concept of stream separation: tracking a non-speech tone, separating it from speech, and recognizing the remaining speech. The exemplary recognizer is able to recognize the speech when, for example, a siren is removed, even though some thin sections of the speech spectrum are lost. Conversely, the FFT approach, without stream separation, is unable to recognize the speech.

Stream Separation Based on Polyphonic Pitch Extraction.

This exemplary method is capable of resolving pitch of multiple speakers simultaneously, and detecting multiple musical instruments simultaneously. This method may run in real-time on a computing device.

High Resolution Spectral Envelope.

A spectral envelope algorithm achieves pitch invariance in the context of feature grouping, without the indiscriminant blurring of the Mel-scale filterbank. This algorithm may run in real-time on a computing device.

Speech Recognizer based on integrating cochlear model into Neural-Network/Hidde-Markov-Model recognizer from Oregon Graduate Institute's Center for Spoken Language Understanding (OGI CSLU).

The exemplary recognizer is fully instrumented out for graphical inspection of cochlea, filterbank, cepstrum, context window, neural-network, diphone, and word output. The recognizer may also provide arbitrarily reconfigurable grammar and vocabulary, is capable of batch runs against TIMIT database, and may generate full statistics including a confusion matrix.

Comparison with Existing Technology

The OGI/CSLU system is used as a reference for the existing technology. Following are the primary differences between the existing technology and the exemplary embodiments of the present invention.

| Attribute | Existing Technology | Exemplary Embodiment |
|---|---|---|
| Spectral Computation | FFT, 64 taps, linear frequency scale, updated every 10 ms. | Cochlea model, 600 taps, logarithmic frequency scale, updated every 22 microseconds. |
| Low-level features | Spectral Energy. | Spectral Energy, fine timing, broadband transients, spectral edges and notches. |
| Cues for stream separation | None | Inter-aural time and level difference, polyphonic pitch, tone tracking, common onset, AM, FM, etc. |
| Pitch invariance | 22-point Mel filterbank, updated every 10 ms. | 600-tap Spectral Envelope updated every 1 ms. |
| Noise robustness | RASTA or Cepstral Mean Subtraction | Full stream separation based on polyphonic pitch. Adaptive noise threshold. |

-continued

| Attribute | Existing Technology | Exemplary Embodiment |
|---|---|---|
| Pitch/Voicing cue | None | Polyphonic pitch extraction based on propriety spectral pitch algorithm. |
| Speaker Normalization | None | Based on early estimate of speaker characteristics at detected beginning of utterance. |
| Phoneme classifier inputs | 130 ms context of cepstrum and delta-cepstrum. | 150 ms context of spectral envelope, pitch/voicing, and transient detection. |
| Phoneme classifier | 3-layer perception, with di-phone output targets, trained on reduced phoneme set. | 3-layer perception, with di-phone output targets, trained on full phoneme set. |
| Back-end | Viterbi search through Hidden Markov model search space. Uses fixed duration limits. No syllabic stress model. | Viterbi search through Hidden Markov model search space. Uses adaptive duration limits with a syllabic stress model. |

Figure 7:
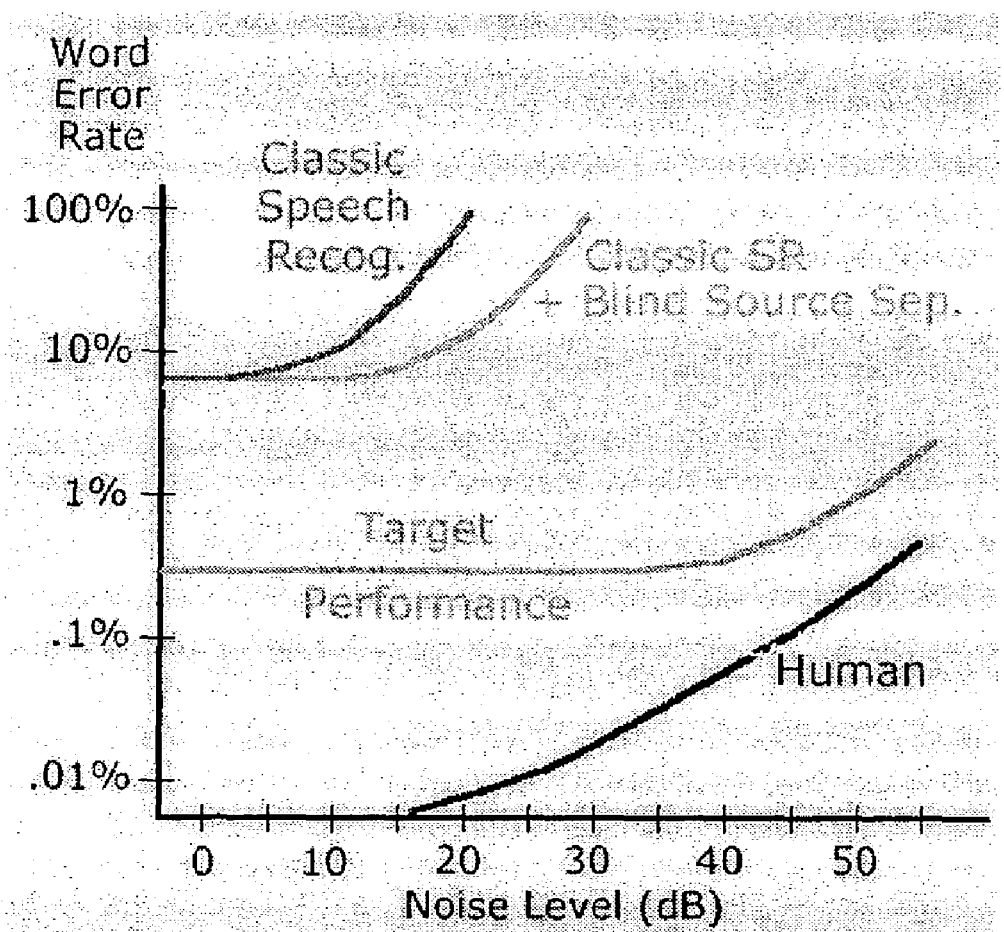
FIG. 7 illustrates performance of a conventional speech recognizer versus noise level.

FIG. 7 shows performance of classic speech recognition versus noise level. The Word Error Rate is presented on a logarithmic scale for better detail, and to show an area of improvement that is an area of focus. Current solutions are at ~92% word accuracy, or 8% word error rate, in quiet conditions, and dramatically worse in the presence of noise. Even noise canceling techniques such as Blind Source Separation only marginally impact performance. By comparison, word-error-rate of humans is several orders of magnitude lower in quiet conditions, and humans are more robust in the presence of noise. The exemplary embodiment's performance target is at least an order of magnitude better than existing systems in quiet conditions, with much better robustness in noisy conditions.

Conventional speech recognition systems with 92% accuracy at the word level typically are performing at about 50-70% accuracy at the phoneme level. This indicates that a front-end and phoneme classifier is surprisingly inaccurate, but the Hidden Markov Model back-end is capable of using constraints of the vocabulary and grammar to determine the spoke words. To reach a target of <0.5% word error rate (99.5% accuracy), it may be necessary to improve phoneme recognition accuracy beyond current state-of-the-art of 75.8%.

Figure 8:
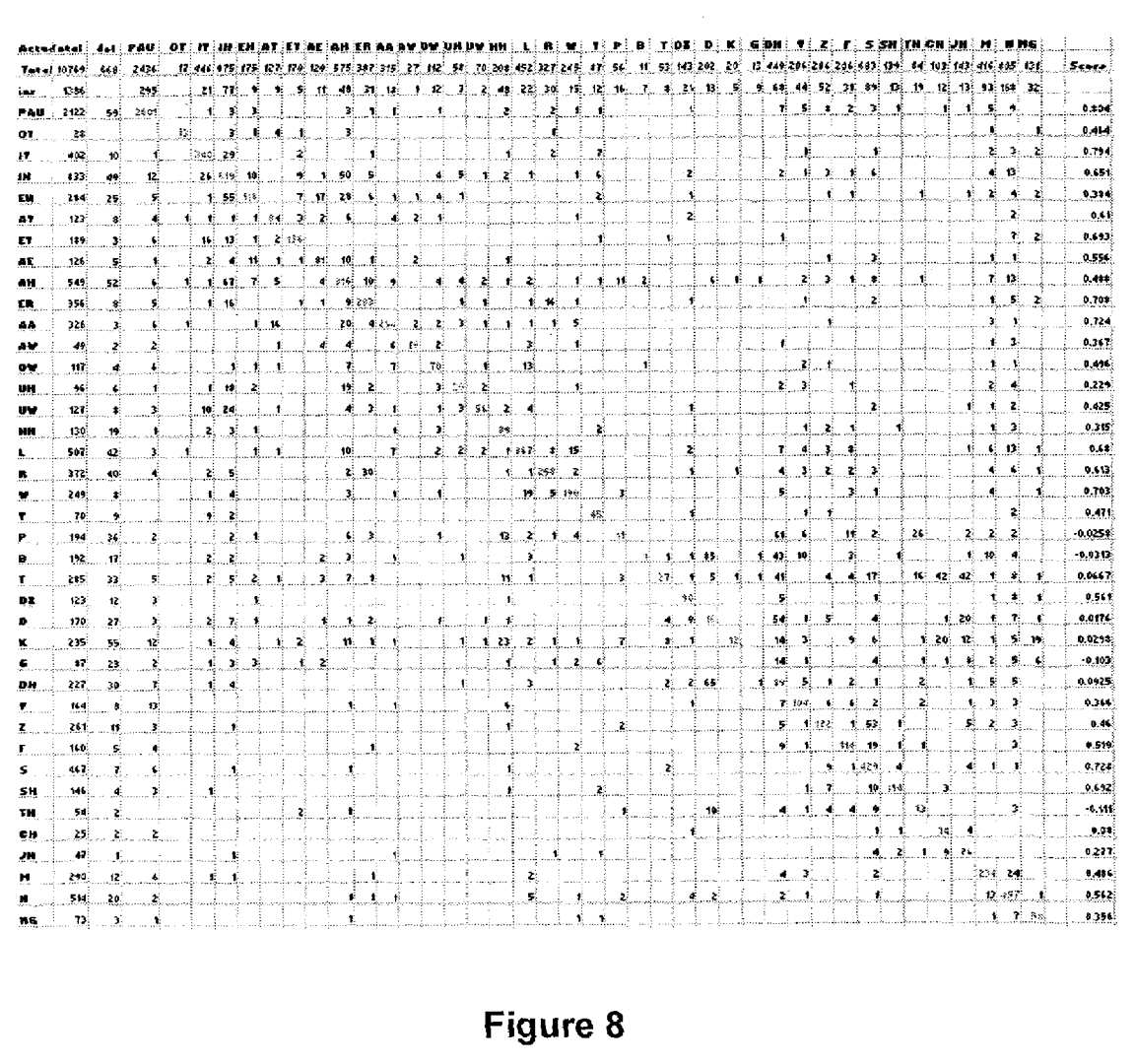
Figure 9:
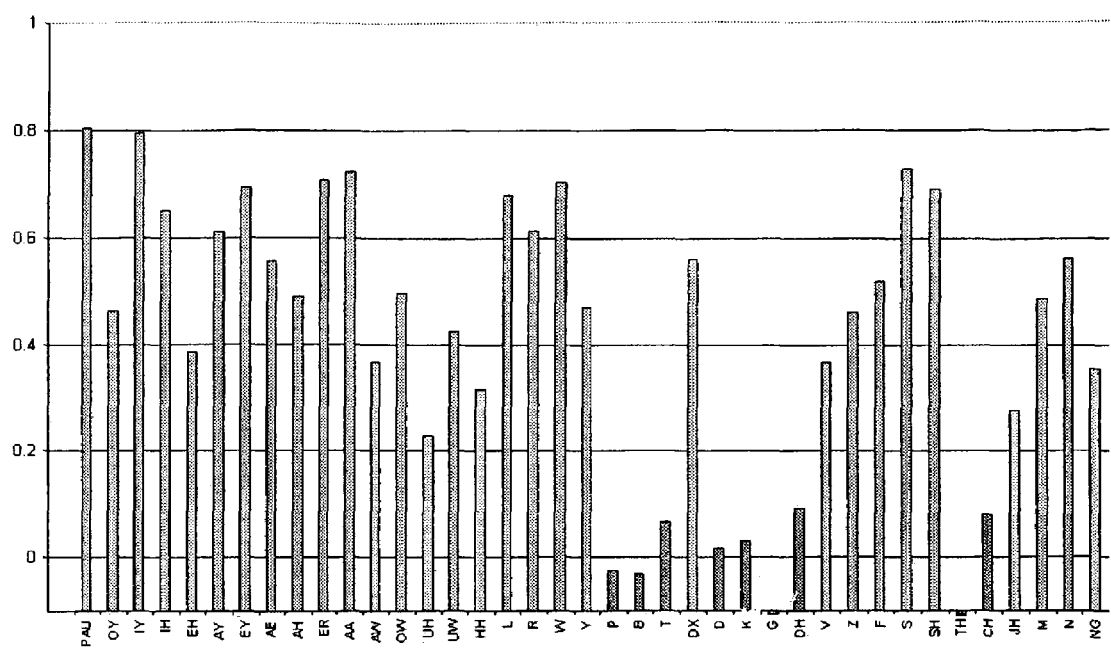
FIG. 9 illustrates scores indicating that stop consonants are the least well-recognized category.

An analysis of the errors made by the OGI/CSLU system on TIMIT phoneme recognition is shown in a confusion matrix in FIG. 8. Scores in FIG. 9 indicate that stop consonants are a least well-recognized category, with recognition accuracy mostly below 10%. Low performance on stop consonants validates the belief that performance will be improved by higher-resolution representations for fast transients and fast formant transitions, and by detection of pitch/voicing, for more accurate estimate of voice-onset time. A graphical summary of the score is given in FIG. 9.

Applications for exemplary embodiments of a noise-robust speech recognizer may include, for example automatic voice-dialing for cell-phones and telephones in general; automatic command and control of navigation systems, environmental controls, communications devices in automobiles; automatic command and control of home electronics appliances; interface to Personal Digital Assistants; and meeting transcription.

The indiscriminate spectral and temporal blurring of the mel-scale filterbank achieves pitch invariance in a low-cost way, at the expense of resolution for stop consonants and for the grouping processes necessary for noise robustness. To achieve human level performance on automatic speech recognition, it may be beneficial to extract and use as much information in an auditory signal as is possible. The present noise-robust speech recognizer exploits known signal processing of a human auditory pathway, efficiently mapped onto modern computational resources, to provide a speech recognition system that is capable of near-human performance.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not be limited to the details given herein, but may be modified within the scope and equivalents of the appended claims.

The invention claimed is:

1. A method of processing an audio signal comprising:
    computing 600 spectral values on a logarithmic frequency scale from the audio signal;
    separating the 600 spectral values into a plurality of streams which group sounds from a same source prior to classification;
    analyzing each separated stream to determine phoneme-level classification; and
    outputting one or more words of the audio signal.

2. The method of processing an audio signal as recited in claim 1 wherein phoneme-level classification accuracy is enhanced by providing as an input to a classifier a spectral envelope.

3. The method of processing an audio signal as recited in claim 1 wherein phoneme-level classification accuracy is enhanced by providing as an input to a classifier detected transients.

4. The method of processing an audio signal as recited in claim 1 wherein phoneme-level classification accuracy is enhanced by providing as an input to a classifier pitch and voicing information.

5. The method of processing an audio signal as recited in claim 1 further comprising normalizing for speaker characteristics prior to classification.

6. The method of processing an audio signal as recited in claim 1 further comprising performing noise-threshold tracking.

7. The method of processing an audio signal as recited in claim 6 further comprising adjusting gain and setting noise floor reference levels based on the noise-threshold tracking.

8. The method of processing an audio signal as recited in claim 1 further comprising training with a full phoneme target set.

9. The method of processing an audio signal as recited in claim 1 further comprising incorporating a model of syllabic stress.

10. The method of processing an audio signal as recited in claim 1 wherein the spectral values are computed with a 6 microsecond resolution post-interpolation.

11. The method of processing an audio signal as recited in claim 1 wherein the spectral values are updated every 22 microseconds.

12. The method of processing an audio signal as recited in claim 1 further comprising using the output for automatic voice-dialing for phones.

13. The method of processing an audio signal as recited in claim 1 further comprising using the output for automatic command of a system or device.

14. The method of processing an audio signal as recited in claim 1 further comprising using the output as an interface to a device.

15. The method of processing an audio signal as recited in claim 1 wherein the output comprises a meeting transcription.

* * * * *